Jan. 9, 1968  R. H. KRASNITZ  3,362,061
METHOD OF MAKING BOURDON TUBES
Filed Oct. 21, 1965  2 Sheets-Sheet 1
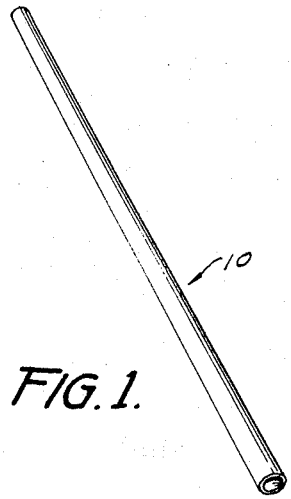
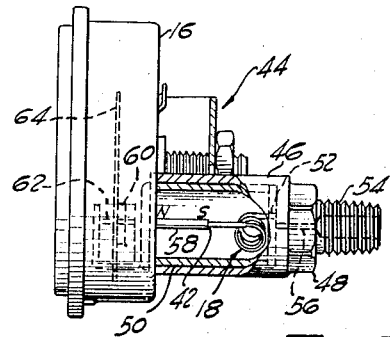
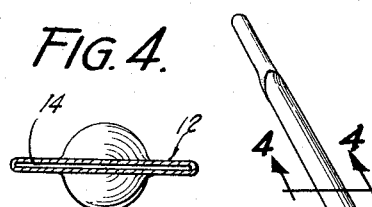
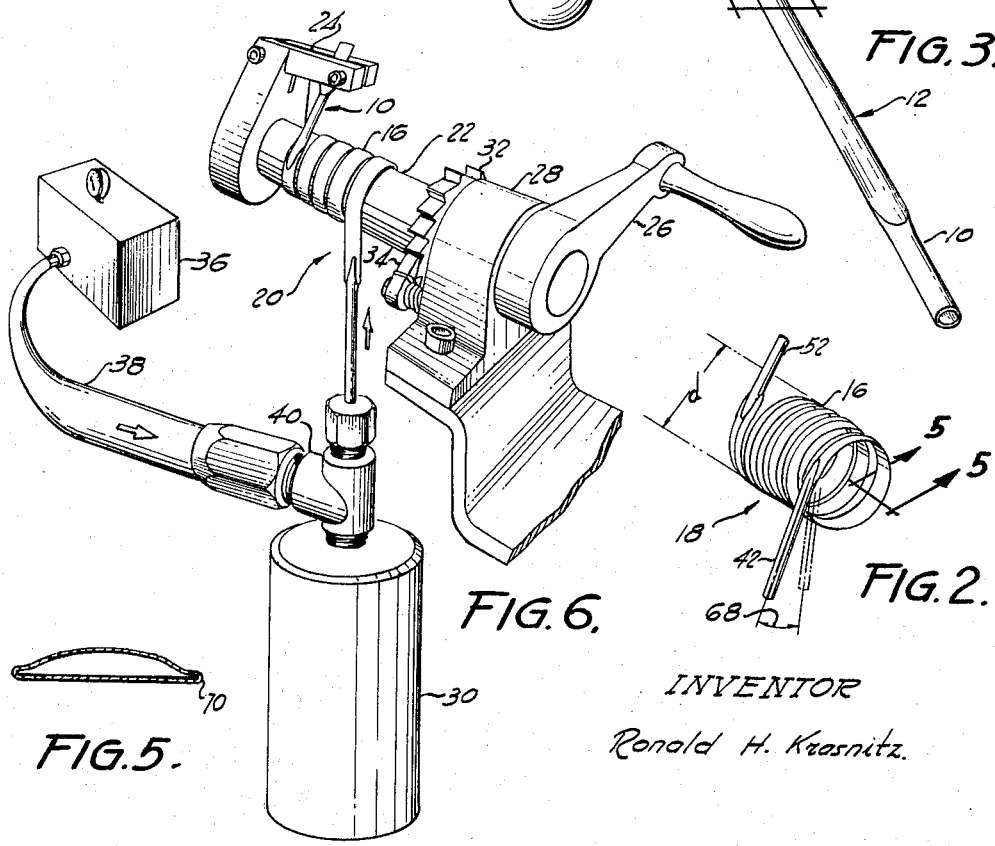
INVENTOR
Ronald H. Krasnitz.
By William J. Newman
Attorney Jan. 9, 1968   R. H. KRASNITZ   3,362,061

METHOD OF MAKING BOURDON TUBES

Filed Oct. 21, 1965   2 Sheets-Sheet 2

ONE COIL TURN.

INVENTOR
Ronald H. Krasnitz.

By William J. Newman
Attorney

United States Patent Office 3,362,061
Patented Jan. 9, 1968

3,362,061
METHOD OF MAKING BOURDON TUBES
Ronald H. Krasnitz, Chicago, Ill., assignor to Stewart-Warner Corporation, Chicago, Ill., a corporation of Virginia
Filed Oct. 21, 1965, Ser. No. 499,899
5 Claims. (Cl. 29—421)

ABSTRACT OF THE DISCLOSURE

There is disclosed a method of making a helical wound Bourdon tube by which a tubular member is wound around an arbor and subjected to internal pressure while maintaining the wound tubular member under tension, the pressure being determined by the desired activity of the tube.

---

This invention relates to Bourdon tube pressure responsive devices, Bourdon tubes and methods for making Bourdon tubes. More particularly, this invention relates to an new method of making more sensitive Bourdon tubes, the unique processes by which the new tubes are fabricated and the improved pressure responsive devices such as pressure gauges resulting from the new tubes.

Generally, Bourdon tube devices include a hollow, resiliently-flexible element which is shaped in the form of a coil of approximately one or more turns with one end fixed and the other end free to move. It usually has an oval or elliptical cross-section and when subjected to a pressure differential between its exterior and interior the coil tube is caused to ravel or unravel depending on the amount and direction of the pressure differential. Thus, the movement of the free end of the coiled tube may be used as an indication of the pressure differential in a pressure gauge, or the like.

Although previous Bourdon tubes have been applicable to measure pressures in the upper as well as lower levels, the range that any particular one was capable of measuring with adequate sensitivity was quite limited. The sensitivity relates of course to the amount of movement of the free end of the tube per unit change of pressure (activity), and the range is related to the maximum pressure which may be applied without causing the tube to permanently deform (set point). These factors are determined to a great extent by the cross-sectional shape of the tube. For example, a Bourdon tube with a very flat oval cross-section will have a very high activity but will have a very low set point. The range of the tube is therefore limited because the tube will become permanently deformed at a low maximum pressure. A Bourdon tube having an elliptical cross-section approaching a circle, however, will have a very high set point, but will have an extremely low activity. Thus, although such a tube may be subjected to high pressures without being permanently deformed, it will not move a great distance even for the highest values, resulting in a low sensitivity device.

The oval and elliptical cross-sectional Bourdon tubes in prevalent use today are apparently the obvious compromises between the two extremes discussed above. However, it has been found that a wider range and more sensitive Bourdon tube may be obtained by utilizing the teachings of this invention. As a part of this invention a new technique for fabricating Bourdon tubes has been discovered which results in a tube having a unique cross-sectional shape, hereinafter referred to as a reflex D-shape. Further, it has been found that Bourdon tubes having the reflex D-shape approach more closely the optimum relationship between the set point and activity than Bourdon tubes previously used. Therefore, wider range and more sensitive pressure gauges may be constructed utilizing the teachings of this invention.

It is an object of this invention to provide a new and unique method for fabricating Bourdon tubes.

It is also an object of this invention to provide a new method of making Bourdon tubes having a unique cross-sectional shape such as to optimize a relationship between their set point and activity.

Another object of this invention is to provide a new method of making an improved Bourdon type pressure responsive device utilizing Bourdon tubes having the unique cross-sectional shape.

Another object of this invention is to provide new economical methods for forming Bourdon tubes which are readily adaptable to the principles of automation.

Another object of this invention is to provide a method for making Bourdon tubes which compensates, at least in part, for deviations in the raw stock used in the process.

Other objects and advantages of this invention will become apparent especially when taken in view of the accompanying drawings in which:

FIG. 1 is an isometric view of a piece of stock prior to its transformation into a Bourdon tube by the methods disclosed herein;

FIG. 2 is an isometric view of a Bourdon tube fabricated by the methods of this invention;

FIG. 3 is an isometric view of the piece of stock of FIG. 1 after the first step of the process of this invention;

FIG. 4 is a cross-section of the piece of stock after the first process step taken along the line 4—4 of FIG. 3;

FIG. 5 is a cross-section of the completed Bourdon tube taken along the line 5—5 of FIG. 2;

FIG. 6 is an isometric view showing a simple type of apparatus which may be used in performing the process of this invention;

FIG. 7 is a side view partially broken away which employs a Bourdon tube fabricated by the processes of this invention;

Figure 8:
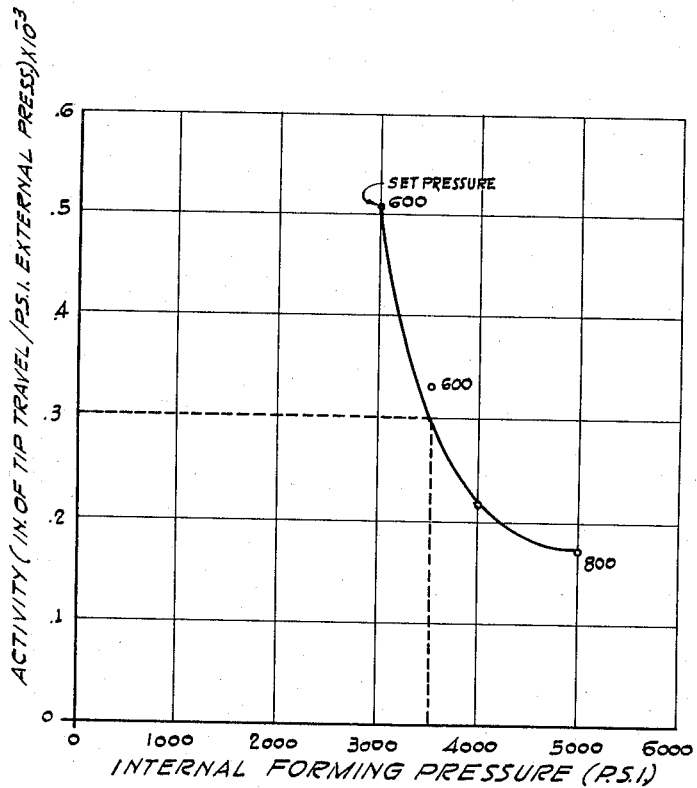
FIG. 8 is a graph of Bourdon tube activity versus the forming pressure which is used in the design of a Bourdon tube embodying the teachings of this invention.

Referring first to FIGS. 1 through 6, a description of the process by which a Bourdon tube embodying the principles of this invention will be made. First, a piece of thin-walled circular tubing of suitable diameter and material is selected. A central portion 12 of the tubular stock 10 is flattened by any suitable means such as a hammer and two flat dies. Sufficient force should be applied to the portion 12 to flatten it with the natural spring back of the material providing a slight opening 14 between the flattened walls so that a pressurized fluid may be forced therethrough in a later step of the process. The length of the flattened portion 12 is dictated by the desired diameter $d$ (FIG. 2) and the number of coils 16 in the finished Bourdon tube 18. Although a 4-turn helix is shown in these figures, it is to be understood that more or less turns may be desired, depending upon the design parameters of the pressure gauge or the like as will be hereinafter described.

The next step is to wind the flattened portion 12 of the tubular stock 10 about a circular form having a diameter in accordance with the desired diameter $d$ of the finished Bourdon tube 18.

FIG. 6 shows a simple but suitable fixture 20 for performing the winding functions. It comprises an arbor 22 which carries a clamp 24 at one end for clamping and sealing one end of the flattened tubular stock 10. It has a crank 26 at its other end for rotation within the journal 28. The arbor 22 should be tiltable in a vertical direction by suitable adjusting means (not shown) to control the spacing of the individual coils 16 of the Bourdon tube. During the winding operation a tensile force such as provided by weight 30 attached to the free end of the tubular stock 10 is maintained. A ratchet 32 and pawl 34 are provided on the arbor 22 to hold the position of the arbor after the flattened tube 10 has been wound the required number of turns.

The tube is now ready for shaping of its cross-sectional area which is accomplished by internally pressurizing it while it is held in tension on the arbor 22. A liquid such as oil is provided from a source 36 through a hose 38 and coupling 40 which also supports the weight 30 on the end of the tube 10. The pressure in the tube is brought to a level determinate of the desired activity of the finished tube which is calculated in accordance with procedures to be hereinafter described. The internal pressure causes the previously flattened portion 12 of the tube to assume the cross-sectional shape shown in FIG. 5 and defined herein as a reflex D-shape.

Next, the pressure is vented and the tube is removed from the arbor 22. Two ends of the tube are cut to a suitable length in accordance with the design of the gauge or device in which it is to be used.

The tube is purged of the pressurizing liquid and this may be conveniently accomplished by unsealing the end of the tube which was clamped by the clamp 24 and blowing a volatile liquid therethrough. Subsequent heating will rid the tube of the volatile material. If the finished Bourdon tube 18 is to be used as an internally pressurized Bourdon tube the free end 42 is sealed preferably by a suitable epoxy or solder. If, however, the finished tube 18 is to be used in an externally pressurized Bourdon tube gauge such as shown in FIG. 7, then both ends of the tube are sealed.

The gauge 44 comprises a pressure capsule 46 formed of two mated cup-shaped members 48 and 50 which are fabricated of a non-magnetic material. The Bourdon tube 18 is sealed at both ends and has one end 52 fixed to the capsule 46. The capsule is connectable at threaded nipple 54 to the pressure source and the restricted passageway 56 provides communication to the interior of the capsule 46. The free end 42 of the Bourdon tube 18 carries a magnet 58 which is in magnetic relationship with a disc magnet 60 mounted outside of the capsule 46 for rotation about an axis defined by a shaft 62. A pointer 64 is adapted to rotate with the disc magnet 60 and both are housed within a case 66 which also has appropriate dial means (not shown) for registry with the pointer 64. Thus, with increasing pressures being applied to the interior of the capsule 46, exterior of the Bourdon tube 18, the tube will tend to curl and cause the free end 42 to move in a direction indicated by arrow 68 in FIG. 2. The magnet 58, carried by the free end 42, attracts the disc magnet 60 to cause it to rotate along with pointer 64, and, thus indicate the increase in pressure. Means (not shown) for calibrating the gauge are provided and are described in detail in the aforementioned copending application.

Because of the odd shape the cross-section of the tube assumes due to the method of forming the same and the relationship thereof to the activity and range, the design of the particular Bourdon tube for a particular application is best accomplished by empirical methods. An empirical method which has been successfully used will therefore be described in correlation with a specific example.

Assume that a zero to 300 p.s.i.g. gauge such as shown in FIG. 7 is desired which utilizes an externally pressurized helical wound Bourdon tube. In designing the mechanical configuration of the gauge it is found that a full scale deflection of the pointer 64 will require a .180" movement of the free end 42 of the Bourdon tube 18. Thus, the activity required for the 300 p.s.i.g. gauge is $$\frac{.180 \text{ in.}}{300 \text{ p.s.i.}}$$

or $.6 \times 10^{-3}$ in./p.s.i.

Tubular stock for use as the Bourdon tube 18 is selected and for the purposes of this example it will be assumed that Inconel X–750 tubing is suitable having a .040" O.D. and a .0025 wall thickness.

Figure 9:
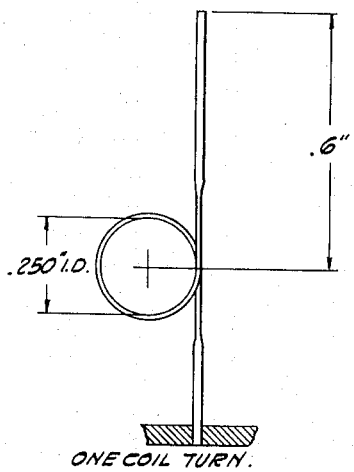
FIG. 9 is a schematic diagram of a Bourdon tube used in the design of a Bourdon tube of this invention.

Several tubes are then wound and formed in accordance with the procedures hereinbefore discussed using different internal pressures for each tube. These tubes for test purposes may have one or more turns, and for the purpose of this example it will be assumed that one turn coils were fabricated such as shown schematically in FIG. 9. The activity of the tubes is directly proportional to the number of turns so that the activity of a single turn tube may be multiplied by the number of turns added. In the specific design case it was desired that the Bourdon tube coil of the gauge have an inner diameter $d$ (FIG. 9) of .250" and a free end tip length $l$ of .6" so the samples were fabricated to those specifications.

The activity of the sample tubes is measured in a test fixture and the results plotted versus the internal forming pressure on a graph such as shown in FIG. 8. The test fixture may be any sort of pressure vessel in which the tubes have their one end fixed, and the movement of their free ends 42 readily observed and measured. After the activity of each of the samples has been measured their set points (maximum pressure they may be subjected to without permanent deformation) is determined by raising the pressure in the vessel until the tubes become permanently deformed. If this pressure is substantially above the maximum gauge pressure to be measured (two times maximum in the instant case) the resulting design will be suitable.

Using the curve of the plotted graph, an internal forming pressure may be determined to obtain the required activity in the design tube. In the specific example it may be seen that an internal forming pressure of 3500 p.s.i. will provide an activity for a single loop Bourdon tube of $.3 \times 10^{-3}$ inches per p.s.i. A two-turn Bourdon tube, therefore, will provide a $.6'' \times 10^{-3}$ per p.s.i. activity which had been calculated previously as that necessary for the design 300 p.s.i.g. gauge. Thus, in the fabrication of an Inconel X–750 Bourdon tube for a 300 p.s.i.g. gauge which tube has a .040" O.D. and a wall thickness of .0025" the flattened tubes should be wound with two turns around the arbor and subjected to an internal pressure of 3500 p.s.i.g. The resulting tube will have at least approximately the desired activity and any deviations may be corrected for in the calibration of the gauge.

The process of forming the Bourdon tubes by subjecting the flattened coiled tubular stock to the required internal pressure inherently compensates for slight differences in the wall thicknesses of the tube stock being used. A thinner wall tube would naturally have a greater activity than a tube with thicker wall thickness. However, the internal pressurization of the thin wall would cause it to expand more so that its cross-section is closer to a circle which reduces the activity. Hence the process compensates for variation in the tube wall thickness.

Although the Bourdon tubes formed by this method may be used in either exterior or interior pressurized gauge configurations, the external pressurized configuration may be preferred in certain instances, such as, when the gauge is subjected to a great number of pressure fluctuations. The reason for this is that the initial flattening of the tube stock and the subsequent expanding of the tube by the application of internal pressure has a tendency to weaken the fibers somewhat at the edges 70 (FIG. 5). Internal pressurization of the tube puts the weakened fibers in tension which might cause an early failure if the pressure was unduly fluctuating. However, if the tube is externally pressurized these edges are under compression forces and the problem is not serious.

Many modifications and additions may be made to the Bourdon tube methods for making the Bourdon tubes and gauges utilizing the Bourdon tubes disclosed herein without materially deviating from the invention. It is

What is claimed is:

1. The method of forming a Bourdon tube for a pressure responsive device, or the like, comprising the steps of winding a flattened, thin-walled, resilient metal tube about a cylindrical arbor, and subsequently pressurizing the interior of said tube to a pressure of a magnitude determinate of the desired activity of the tube while maintaining said tube under tension.

2. The method of forming a helical wound Bourdon tube for a pressure responsive device or the like, comprising the steps of flattening a portion of a thin-walled resilient metal tube, sealing one end of said tube, coiling at least a portion of said flattened portion about a cylindrical arbor, pressurizing the interior of said tube through its unsealed end to a pressure of a magnitude determinate of the desired activity of the tube while maintaining said tube under tension, releasing the pressure in the tube, and removing the tube from the arbor.

3. The method of forming a helical wound Bourdon tube for a pressure responsive device or the like, comprising the steps of flattening a portion of a thin-walled resilient metal tube, sealing one end of said tube, coiling at least a portion of said flattened portion about a cylindrical arbor, submitting the interior of said tube through its unsealed end to a liquid under pressure of a magnitude determinate of the desired activity of the tube while maintaining said tube under tension, releasing the pressure of the liquid, removing the tube from the arbor, and cleansing the liquid from the interior of the tube.

4. The method of forming a helical wound Bourdon tube for a pressure responsive device or the like, comprising the steps of flattening a portion of a thin-walled resilient metal tube, sealing one end of said tube, coiling at least a portion of said flattened portion about a cylindrical arbor while maintaining said tube under tension, submitting the interior of said tube through its unsealed end to a liquid under pressure of a magnitude determinate of the desired activity of the tube while maintaining the tube under tension, releasing the pressure of the liquid, removing the tube from the arbor, cutting the ends of the tube to the desired length including the sealed end of the tube, cleansing the liquid from the interior of the tube with a volatile material, heating the tube to volatilize the material, and sealing at least one end of the tube.

5. The method of forming a Bourdon tube for a pressure responsive device or the like comprising the steps of winding a resilient metal tube of a given cross section about a cylindrical arbor, and subsequently pressurizing the interior of said tube while maintaining said tube under tension to change the cross section of said tube, the magnitude of the pressure being determined by the desired activity of the tube.

References Cited

UNITED STATES PATENTS 2,366,141   12/1944   Alderfer _____ 29—421 X
3,091,023   5/1963    Carlson _____ 29—421 X THOMAS H. EAGER, *Primary Examiner.*

LOUIS R. PRINCE, *Examiner.*

D. O. WOODIEL, *Assistant Examiner.*